(12) United States Patent
Hutchins et al.

(10) Patent No.: US 8,564,598 B2
(45) Date of Patent: Oct. 22, 2013

(54) PARALLELOGRAM UNIFIED PRIMITIVE DESCRIPTION FOR RASTERIZATION

(75) Inventors: Edward A. Hutchins, Mountain View, CA (US); William T. Warner, Jr., Sunnyvale, CA (US); Christopher D. S. Donham, San Mateo, CA (US)

(73) Assignee: Nvidia Corporation, Santa Clara, CA (US)

( * ) Notice: Subject to any disclaimer, the term of this patent is extended or adjusted under 35 U.S.C. 154(b) by 1278 days.

(21) Appl. No.: 12/001,251

(22) Filed: Dec. 10, 2007

(65) Prior Publication Data

US 2009/0147012 A1 Jun. 11, 2009

Related U.S. Application Data

(60) Provisional application No. 60/965,044, filed on Aug. 15, 2007.

(51) Int. Cl.
*G06T 1/00* (2006.01)

(52) U.S. Cl.
USPC .......................................... 345/501; 345/419

(58) Field of Classification Search
USPC ................................. 345/501, 419
See application file for complete search history.

(56) References Cited

U.S. PATENT DOCUMENTS

| | | | |
|---|---|---|---|
| 5,193,145 A * | 3/1993 | Akeley | 345/423 |
| 6,049,876 A | 4/2000 | Moughanni et al. | |
| 6,330,624 B1 | 12/2001 | Cromer et al. | |
| 6,498,748 B2 | 12/2002 | Ikeda | |
| 6,577,305 B1 * | 6/2003 | Duluk et al. | 345/419 |
| 6,630,936 B1 | 10/2003 | Langendorf | |
| 6,651,171 B1 | 11/2003 | England et al. | |
| 7,474,312 B1 | 1/2009 | Rohrer et al. | |
| 2002/0112175 A1 | 8/2002 | Makofka et al. | |
| 2002/0163522 A1 | 11/2002 | Porter et al. | |
| 2003/0115472 A1 | 6/2003 | Chang | |
| 2003/0191943 A1 | 10/2003 | Poisner et al. | |
| 2003/0200435 A1 | 10/2003 | England et al. | |
| 2003/0204693 A1 | 10/2003 | Moran et al. | |
| 2003/0233562 A1 | 12/2003 | Chheda et al. | |
| 2008/0273028 A1 * | 11/2008 | Jiao et al. | 345/420 |

FOREIGN PATENT DOCUMENTS

WO WO02/25416 3/2002

* cited by examiner

*Primary Examiner* — Maurice L McDowell, Jr.

(57) ABSTRACT

In a graphics pipeline of a graphics processor, a method for a unified primitive description for rasterization. The method includes receiving a group of primitives from a graphics application, wherein the group includes different types of primitives and the types of primitives include line primitives, point primitives and triangle primitives. For each of the types of primitives, the method includes generating a corresponding parallelogram, wherein the parallelogram has four sides disposed along an x-axis and a y-axis, and computing an inside y-axis mid point and an outside y-axis mid point based on the four sides. The parallelogram is controlled to represent to each of the primitive types respectively by adjusting a location of the inside y-axis mid point or the outside y-axis mid point.

21 Claims, 6 Drawing Sheets

PARALLELOGRAM UNIFIED PRIMITIVE DESCRIPTION FOR RASTERIZATION

This application claims the benefit of the U.S. Provisional Application No. 60/965,044, filed on Aug. 08, 15 2007, titled "PARALLELOGRAM UNIFIED PRIMITIVE DESCRIPTION FOR RASTERIZATION", by Hutchins, E. et al.

FIELD OF THE INVENTION

The present invention is generally related to hardware accelerated graphics computer systems.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a point, line, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data, where the instructions/data are fed into the front end of the pipeline and the computed results emerge at the back end of the pipeline. The hardware-based functional units, cache memories, firmware, and the like, of the GPU are optimized to operate on the low-level graphics primitives (e.g., comprising "points", "lines", "triangles", etc.) and produce real-time rendered 3-D images.

The real-time rendered 3-D images are generated using raster display technology. Raster display technology is widely used in computer graphics systems, and generally refers to the mechanism by which the grid of multiple pixels comprising an image are influenced by the graphics primitives. For each primitive, a typical rasterization system generally steps from pixel to pixel and determines whether or not to "render," or write a given pixel into a frame buffer or pixel map, as per the contribution of the primitive. This, in turn, determines how to write the data to the display buffer representing each pixel. Various traversal algorithms and various rasterization methods have been developed for computing from a graphics primitive based description to a pixel based description (e.g., rasterizing pixel to pixel per primitive) in a way such that all pixels within the primitives comprising a given 3-D scene are covered.

Once the primitives are rasterized into their constituent pixels, these pixels are then processed in pipeline stages subsequent to the rasterization stage where the rendering operations are performed. Generally, these rendering operations assign a color to each of the pixels of a display in accordance with the degree of coverage of the primitives comprising a scene. The per pixel color is also determined in accordance with texture map information that is assigned to the primitives, lighting information, and the like.

A problem exists however with the ability of prior art 3-D rendering architectures to scale to handle the increasingly complex 3-D scenes of today's applications. Open GL is one of the widely used industry standard APIs (Application Programming Interface) used for creating 3D applications. Graphics hardware has developed specialized hardware to specifically accelerate OpenGL based processing. OpenGL hardware acceleration has to support a variety of drawing primitive types. Such primitive types include points, lines, and triangles.

One typical prior art solution is to create each of the types of primitives internally by using a single graphics primitive, most commonly a triangle. A point, for example, which has non-zero height and width, is drawn out of two triangles. This process is inefficient, however, for at least 2 reasons: 1) power and time are consumed by communicating the two triangles from the setup unit to the raster unit of the graphics processor; and 2) rasterization of triangles usually has inefficiencies. The power and time requirements can be a problem if many relatively small points are being drawn. The rasterization inefficiencies are caused by partially covered rasterization tiles, intersections with scissor and window boundaries, and sparse coverage of sampling points. This problem is exacerbated if multisampling is used to support, for example, anti-aliasing algorithms. The rasterization drawbacks also present obstacles in the scaling process, where engineers continually strive to improve the performance and the efficiency of graphics processor architectures.

Thus, a need exists for a rasterization process that can scale as graphics application needs require and provide added performance without incurring penalties such as increased power consumption and/or reduced fabrication yield.

SUMMARY OF THE INVENTION

Embodiments of the present invention provide a method and system for a rasterization process that can scale as graphics application needs require and provide added performance without incurring penalties such as increased power consumption and/or reduced fabrication yield.

In one embodiment, the present invention is implemented as a method for a unified primitive description for rasterization in a graphics pipeline of a graphics processor. The method includes receiving a group of primitives from a graphics application, wherein the group includes different types of primitives and the types of primitives include line primitives, point primitives and triangle primitives. For each of the types of primitives, the method includes generating a corresponding parallelogram, wherein the parallelogram has either four sides, or two sides and a bisector, disposed along an x-axis and a y-axis. An inside y-axis mid point and an outside y-axis mid point are computed based on the four sides. The parallelogram is controlled to represent to each of the primitive types respectively by adjusting a location of the inside y-axis mid point or the outside y-axis mid point.

In one embodiment, a setup unit of the graphics pipeline is configured to receive the group of primitives (e.g., from a graphics application, etc.) and generate a corresponding parallelogram for each one of the group of primitives. In this manner, a common primitive description, in this case a parallelogram can be used to represent each of the different types of graphics primitives that may be produced by the graphics application. The setup unit can be coupled to communicate with a raster unit via an interface that is optimized for the transmission of these parallelogram parameters. The raster unit can be configured to correspondingly interpret the parallelogram parameters and efficiently rasterize pixels based on the parameters.

In one embodiment, when the parallelogram parameters are interpreted by the raster unit, the parallelogram parameters are configured to collapse into a triangle type primitive as controlled by the location of the inside y-axis mid point or the location of the outside y-axis mid point. In this embodiment, the parallelogram bisector may be transmitted in lieu of one of the four parallelogram edges to facilitate the rendering of a triangle as half of a parallelogram. The parallelogram parameters are configured as a square to represent a point type primitive. The parallelogram parameters are configured as a rectangle to represent a line type primitive.

In this manner, a common primitive description can be used to represent each of the different types of primitives that are produced by graphics applications. This attribute allows hardware of the setup unit and raster unit to be streamlined and optimized to efficiently rasterize all the different types of primitives that may be produced by a graphics application.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
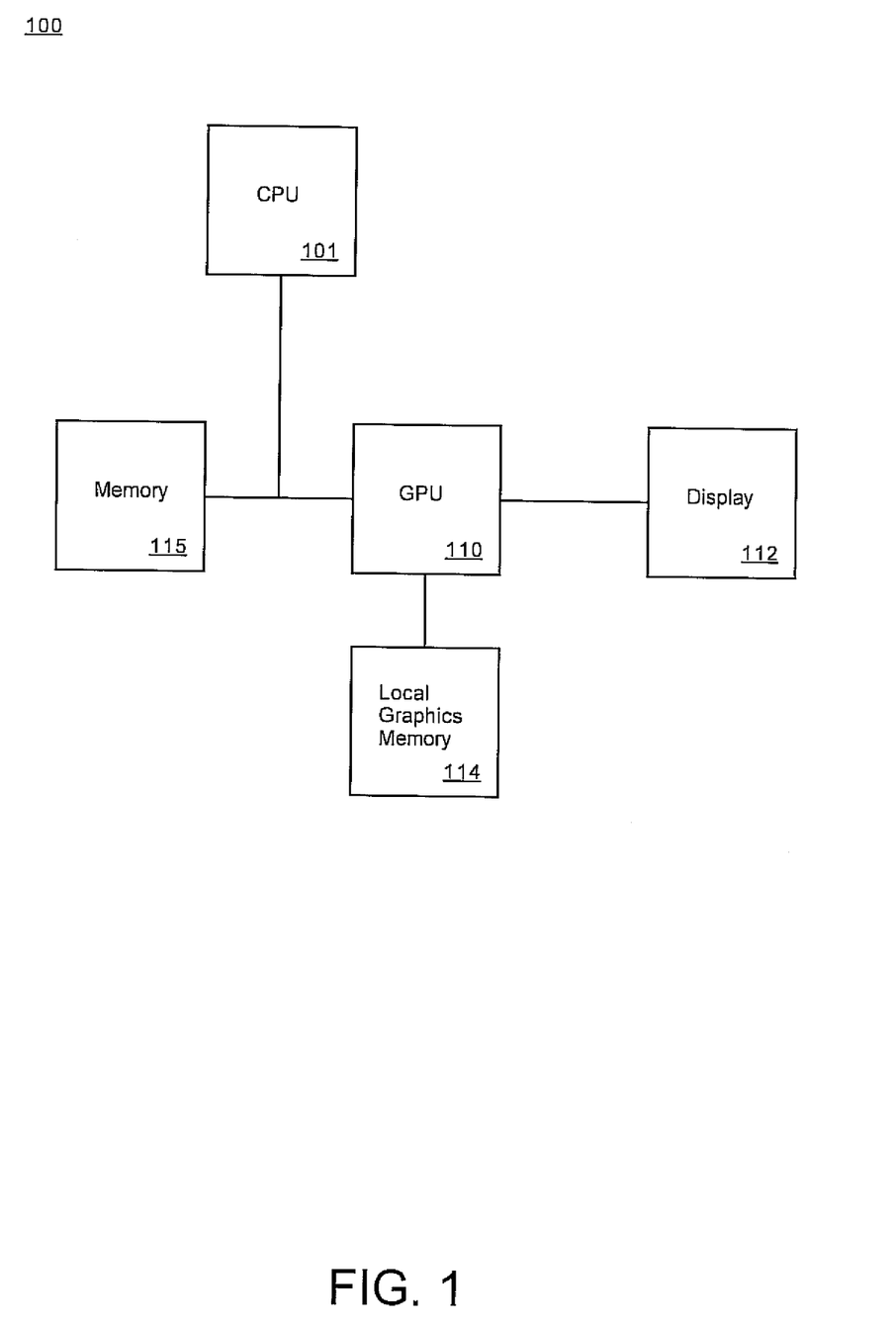
FIG. 1 shows a computer system in accordance with one embodiment of the present invention.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown).

Additionally, a local graphics memory 114 can be included for the GPU 110 for high bandwidth graphics data storage.

Embodiments of the Invention

Embodiments of the present invention implement a method and system for a unified primitive description for rasterization in a graphics pipeline of a graphics processor (e.g., GPU 110). The method includes receiving a group of primitives from a graphics application, wherein the group includes different types of primitives and the types of primitives include line, point, and triangle primitives. For each of the types, the method includes generating a corresponding parallelogram, wherein the parallelogram has either four sides, or two sides and a bisector, disposed along an x-axis and a y-axis. An inside y-axis mid point and an outside y-axis mid point are computed based on the four sides. The parallelogram is controlled to represent to each of the primitive types respectively by adjusting a location of the inside y-axis mid point or the outside y-axis mid point, thus allowing a common primitive description, in this case a parallelogram, to represent each of the different types of graphics primitives that may be produced by the graphics application. The setup unit can be coupled to communicate with a raster unit via an interface that is optimized for the transmission of these parallelogram parameters. Similarly, the raster unit can be configured to correspondingly interpret the parallelogram parameters and efficiently rasterize pixels based on the parameters. Embodiments the present invention and their benefits are further described below.

Figure 2:
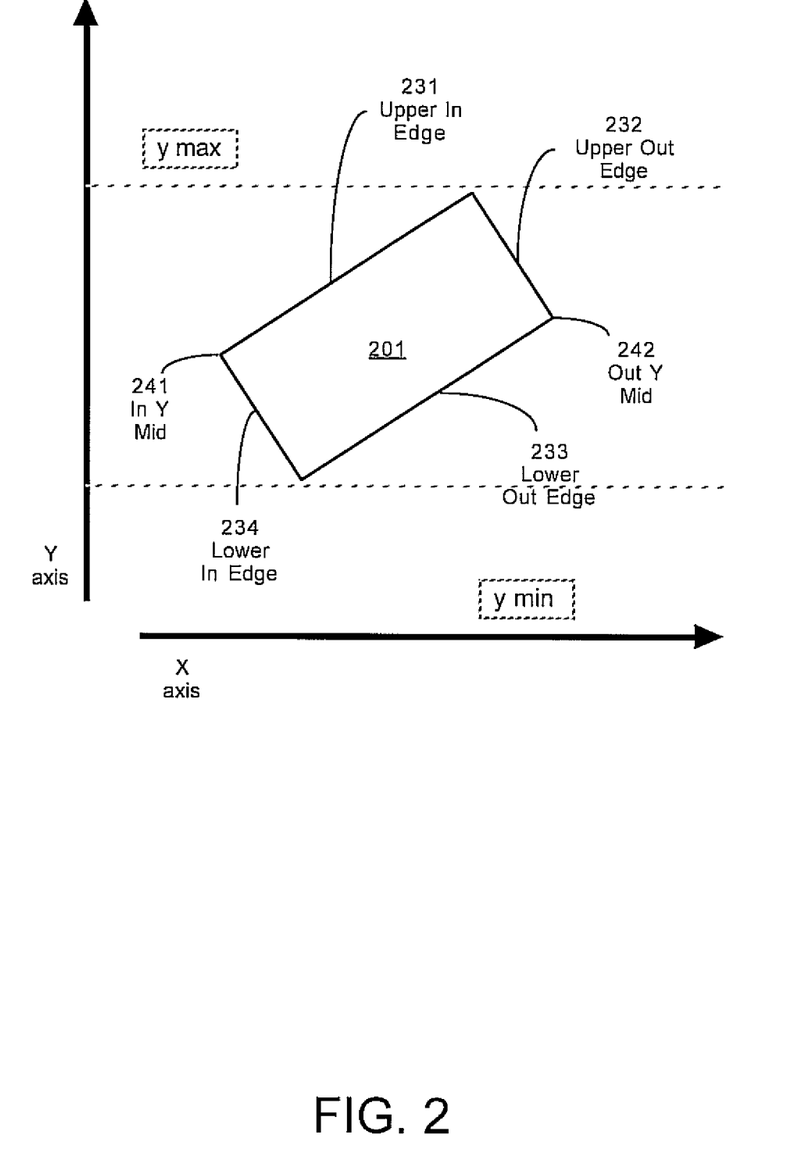
FIG. 2 shows a diagram of a parallelogram disposed against a y-axis and an x-axis in accordance with one embodiment of the present invention.

FIG. 2 shows a diagram of a parallelogram 201 disposed against a y-axis and an x-axis in accordance with one embodiment of the present invention. As depicted in FIG. 2, the parallelogram 201 comprises four edges, an upper in edge 231, an upper out edge 232, a lower out edge 233, and a lower in edge 234.

The FIG. 2 embodiment shows the four edges 231-234 that comprise the parallelogram 201. These edges are mathematically defined and generated by a setup unit (e.g., shown below in FIG. 6) within the GPU 110, and they represent the parallelogram within 3-D space. The parallelogram 201 is shown disposed against the x-axis and y-axis since that is the plane of rasterization upon which the parallelogram 201 will be rasterized (e.g., by a raster unit shown below in FIG. 6).

The four edges 231-234 are defined by edge equations that are used by the setup unit and the raster unit to determine what pixels are inside and what pixels are outside the parallelogram 201. Thus, as a rasterization process proceeds from left to right, a line of rasterization goes from outside to inside as it crosses either the upper in edge 231 or the lower in edge 234, and goes from inside to outside as the crosses either the upper out edge 232 or the lower out edge 233.

In one embodiment, the setup unit is further configured to compute an in y midpoint 241 and an out y midpoint 242 as shown in FIG. 2. The points 241-242 are those points on the rasterization row (e.g., a horizontal row) at which the parallelogram switches from one edge to another. Thus, as shown in FIG. 2, the in y mid point 241 is that point where a line of rasterization would transition between the upper in edge 231 and the lower in edge 234. Similarly, the out y midpoint 242 is that point where a line of rasterization would transition between the upper out edge 232 and the lower out edge 233.

After generating the parallelogram 201, the setup unit transmits the information about the edges 231-234 to the raster unit along with the midpoints 241-242 to indicate the cross-over point from upper edges to lower edges for the in and out edges, respectively. This information comprises parallelogram parameters that are interpreted by the raster unit to rasterize the parallelogram into pixels.

Figure 3:
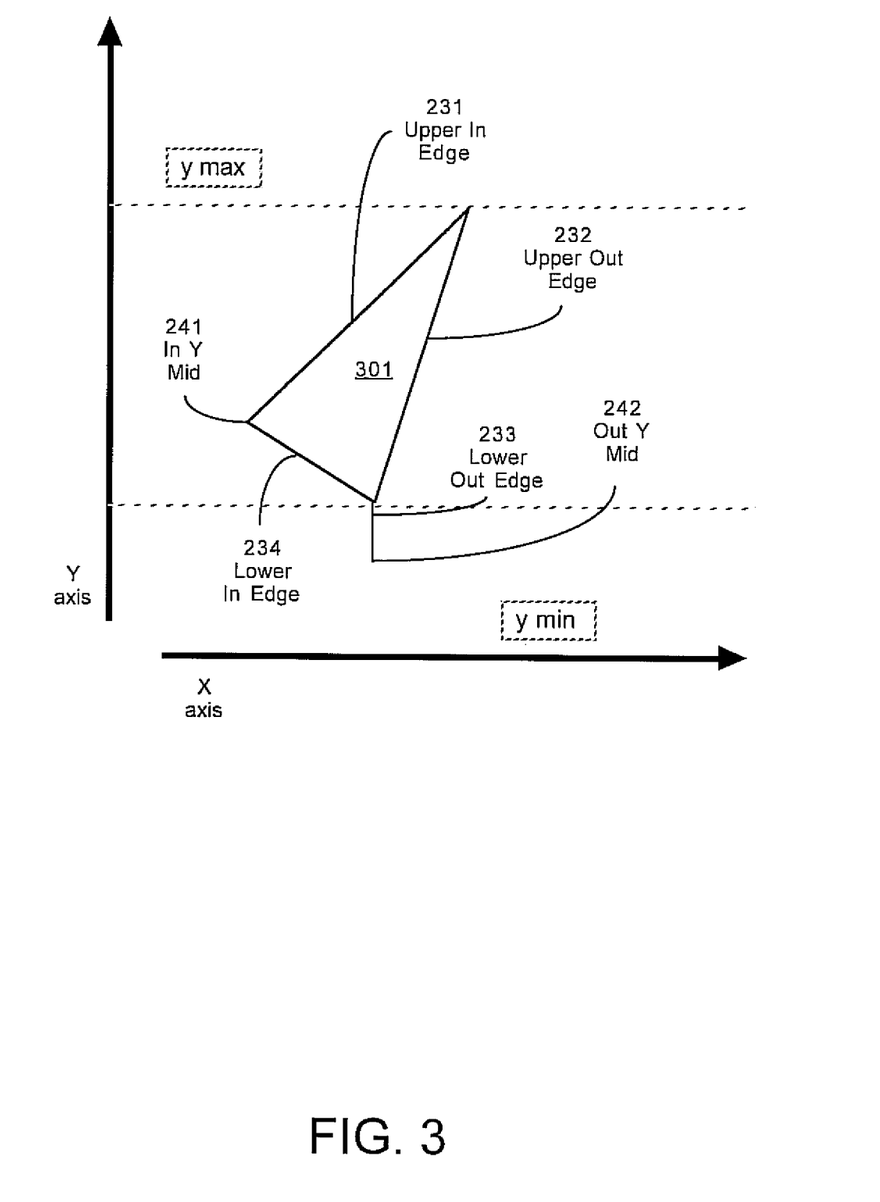
FIG. 3 shows a diagram of a first triangle that results from the parallelogram primitive description in accordance with one embodiment of the present invention.

FIG. 3 shows a diagram of a first triangle 301 that results from the parallelogram 201 in accordance with one embodiment of the present invention. As depicted in FIG. 3, the triangle 301 is shown with the out y midpoint 242 moved to position below the triangle 301. In this embodiment, the upper out edge 232 of the parallelogram may be programmed with the parallelogram bisector rather than the actual parallelogram edge since the triangle covers only half of the parallelogram.

When drawing a triangle, the in or out y midpoint is set to be above or below the parallelogram causing the parallelogram to degenerate into a triangle. In the FIG. 3 embodiment, as described above, when the setup unit wants to draw a triangle, the setup unit causes the in y midpoint 241 or the out y midpoint 242 to be disposed above or below the parallelogram 201. In this situation, the optimal architecture may be obtained by replacing the upper out edge 232 with the bisector of the parallelogram in the output of the setup unit. This resulting relationship causes the parallelogram 201 to essentially degenerate into a triangle. FIG. 3 shows a case where the out y midpoint 242 was moved to be below the parallelogram 201, thereby causing the parallelogram to convert into the triangle 301. As shown in FIG. 3, the out midpoint 242 is below the triangle 301. The lower out edge 233 is now ignored by the raster unit as it rasterizes the resulting triangle 301. With the parallelogram bisector contained in the upper out edge 232, the raster unit can rasterize to the edge without requiring special hardware in the raster unit to compute the parallelogram bisector.

Figure 4:
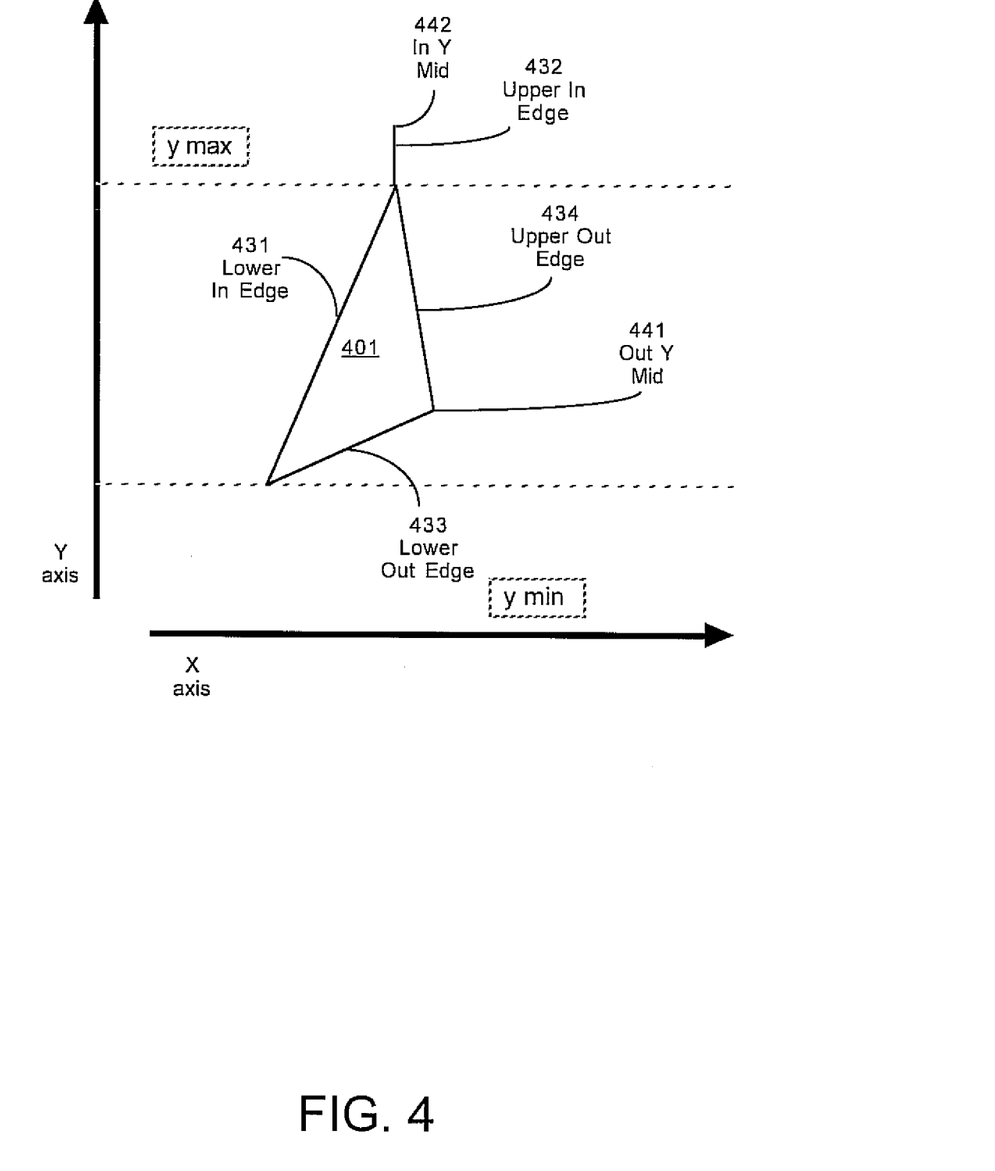
FIG. 4 shows a diagram of a second triangle that results from the parallelogram primitive description in accordance with one embodiment of the present invention.

FIG. 4 shows a diagram of a second triangle 401 that results from the parallelogram 201 in accordance with one embodiment of the present invention. As depicted in FIG. 4, the triangle 401 is shown with the in y midpoint 442 moved to position above the triangle 401. The upper out edge 434, out y midpoint 441, and the lower out edge 433 are as shown. FIG. 4 is similar to FIG. 3 except that FIG. 4 shows a case where the in y midpoint 442 is moved above the triangle 401. Similarly, the parallelogram bisector is placed in the lower in edge 431 to simplify the raster unit. This causes the parallelogram to convert into the triangle 401, where the raster unit now ignores the upper in edge 432 when rasterizing the resulting triangle 401.

In one embodiment, rasterization limits can be used to constrain the minimum and maximum valid Y values. In such an embodiment, the minimum and maximum Y values (e.g., of the 3 or 4 primitive points) are computed, and rasterization processing by the raster unit is constrained to the region between them. This allows the unused 4th edge (e.g., upper in edge 432) of a degenerate parallelogram to be ignored, since the extra edge is outside the y min/max region.

Figure 5:
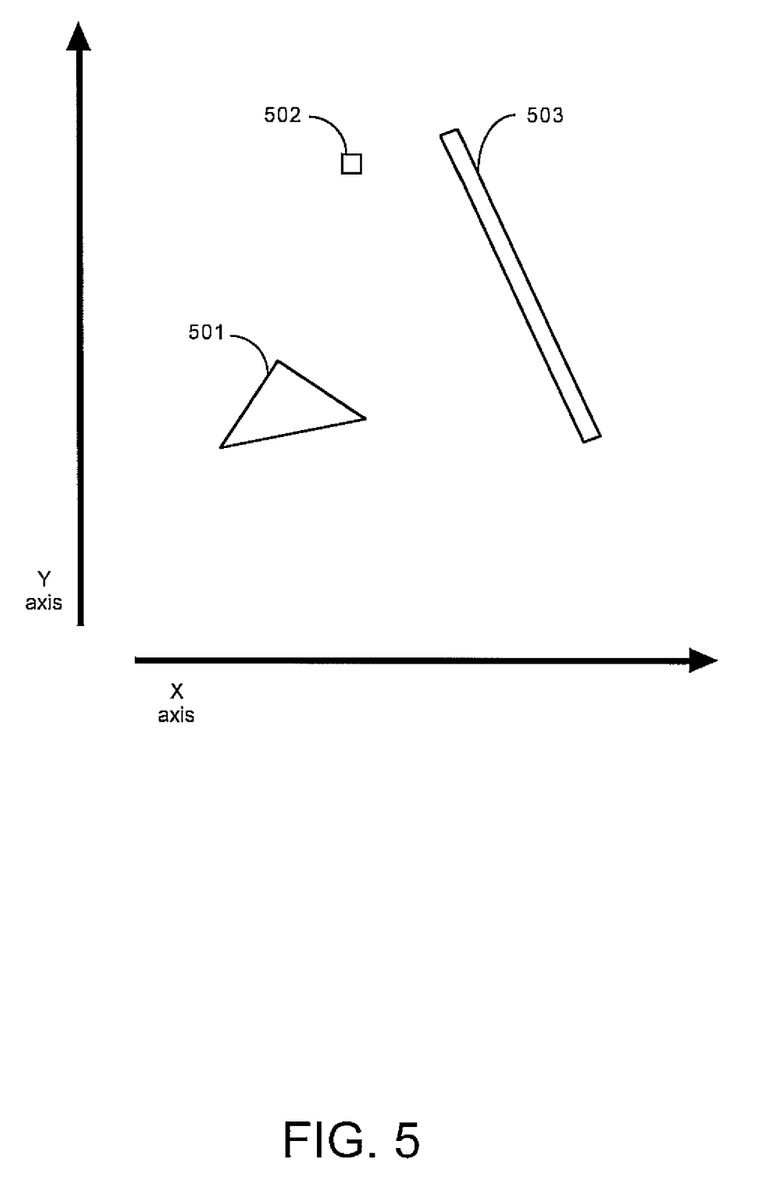
FIG. 5 shows the manner in which embodiments of the present invention can utilize a common primitive description to represent each of the different types of primitives that are produced by graphics applications.

FIG. 5 shows a diagram of three different types of primitives that can each be represented by a common primitive description in accordance with one embodiment of the present invention.

FIG. 5 shows the manner in which embodiments of the present invention can utilize a common primitive description to represent each of the different types of primitives that are produced by graphics applications. For example, a 3-D graphics rendering application can utilize a rendering API, such as, for example OpenGL, and output a stream of graphics primitives to the GPU 110 to model a 3-D object. The stream of graphics primitives can include multiple different primitive types, including, but not limited to, points, lines, triangles, quadrilaterals, and the like.

Each of the different types of primitives can be represented using a common unified primitive description, such as the parallelogram as described above. For example, the parallelogram generated by the setup unit can be readily used to represent the point primitive 502 (e.g., to represent points of various different sizes) and the line primitive 503 (e.g., to represent lines of various different lengths, thicknesses, etc.). Additionally, as described above, the parallelogram parameter information produced by the setup unit can be used to represent the triangle primitive 501.

Figure 6:
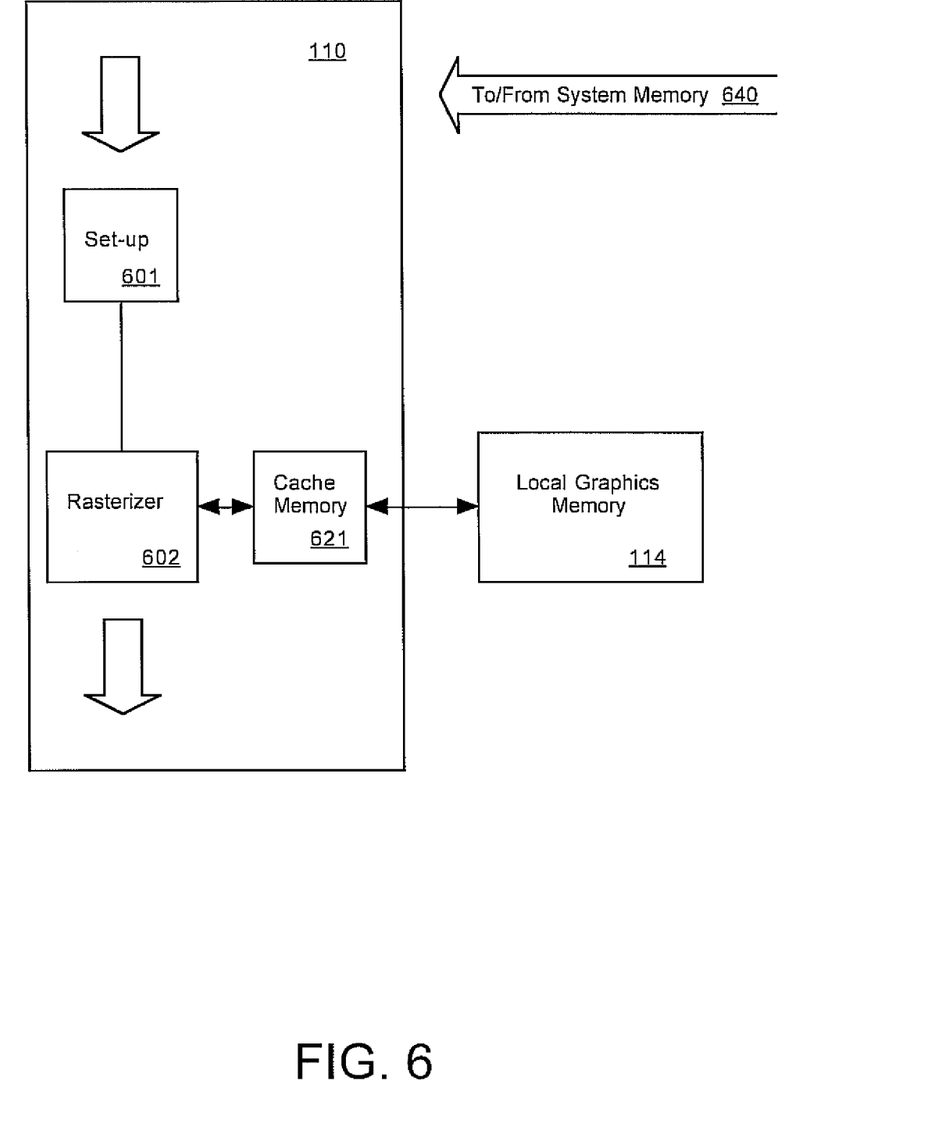
FIG. 6 shows a diagram of a setup unit coupled to a raster unit in accordance with one embodiment of the present invention.

FIG. 6 shows a diagram of a setup unit 601 coupled to a raster unit 602 in accordance with one embodiment of the present invention. As depicted in FIG. 6, the raster unit 602 is coupled to the graphics memory 114 via a cache memory 621, and is coupled to system memory via the bus 640 as shown.

The FIG. 6 embodiment shows exemplary components within the GPU 110 that implement the functionality of embodiments of the present invention. The setup unit 601 functions by receiving groups, streams, and the like, of primitives from a graphics application executing on the host CPU (e.g., CPU 101). The setup unit 601 prepares this information for rasterization by the raster unit 602. The cache memory 621 is optionally included and provides a high-speed low latency memory to facilitate the rasterization of the pixels and functions by reducing the apparent latency of the local graphics memory 114.

The groups of primitives received by the setup unit 601 include different types of primitives, such as line type primitives, point type primitives, triangle type primitives, and the like. As described above, for each of the types of primitives, the setup unit 601 generates a set of parameters for a common unified primitive description (e.g., a parallelogram).

The communications link between the setup unit 601 and the raster unit 602 and the corresponding link interfaces of the setup unit 601 and the raster unit 602 are streamlined and optimized to efficiently convey the parameters for the common unified primitive description, preferably a parallelogram. For each of the different types of primitives that may be received from a graphics application executing on the computer system, a set of parallelogram parameters are transmitted from the setup unit 601 to the raster unit 602.

The use of the common parallelogram primitive eliminates any need or any requirement for any specialized hardware interfaces to handle special cases of primitive types. For example, no special hardware interfaces are required to handle point type primitives or line type primitives. Additionally, for example, there is no need to geometrically expand the number primitives within a model by breaking down all of the primitive types into triangles (e.g., breaking line primitives into two triangles, primitives into two or more triangles, etc.). As a result, hardware of the setup unit 601 and raster unit 602 can be streamlined and optimized to run faster, generating more rasterized pixels per clock, and run requiring less power, since the resulting geometry is less since fewer primitive types are used.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a graphics pipeline of a graphics processor, a method for a unified primitive description for rasterization to render an image, comprising:
   receiving a group of primitives from a graphics application, wherein the group includes different types of primitives and the types of primitives include line primitives, point primitives and triangle primitives in order to render an image;
   for each of the types of primitives, generating a corresponding parallelogram, wherein the parallelogram has four sides disposed along an x-axis and a y-axis;
   computing an inside y-axis mid point and an outside y-axis mid point based on the four sides; and
   controlling the parallelogram to each of the primitive types respectively by adjusting a location of the inside y-axis mid point or the outside y-axis mid point.

2. The method of claim 1, wherein a setup unit is configured to receive the group of primitives and generate the corresponding parallelogram for each one of the group of primitives.

3. The method of claim 2, wherein the setup unit is coupled to communicate with a raster unit via an interface optimized for the transmission of parallelogram parameters.

4. The method of claim 2, wherein the raster unit is configured to interpret the parallelogram parameters and rasterize a plurality of resulting pixels based on the parallelogram parameters.

5. The method of claim 4, wherein the parallelogram parameters are configured as a square to represent a point type primitive.

6. The method of claim 4, wherein the parallelogram parameters are configured as a rectangle to represent a line type primitive.

7. The method of claim 4, wherein the parallelogram parameters are configured to collapse into a triangle type primitive when processed by the raster unit as controlled by the location of the inside y-axis mid point or the location of the outside y-axis mid point.

8. The method of claim 1, wherein the generating of a corresponding parallelogram for each of the types of primitives is configured to reduce a number primitives used to model a 3-D scene including line primitives, point primitives, and triangle primitives.

9. A GPU (graphics processor unit) utilizing a common primitive definition independent of primitive type, comprising:
   a set-up unit for receiving a group of primitives from a graphics application, wherein the group includes different types of primitives and the types of primitives include line primitives, point primitives and triangle primitives, wherein for each of the types of primitives, the setup unit generates a corresponding parallelogram, wherein the parallelogram has a plurality of sides disposed along an x-axis and a y-axis, and wherein an inside y-axis mid point and an outside y-axis mid point is computed based on the four sides; and
   a raster unit coupled to the set-up unit for rasterizing a plurality of pixels in accordance with a plurality of parallelogram parameters received from the setup unit, wherein the setup unit controls the parallelogram to represent each of the primitive types respectively by adjusting a location of the inside y-axis mid point or the outside y-axis mid point.

10. The GPU of claim 9, wherein a parallelogram bisector is transmitted from the setup unit to the raster unit to implement the rendering of a triangle primitive as half of the corresponding parallelogram.

11. The GPU of claim 9, wherein a minimum axis value and a maximum axis value is computed, and rasterization by the raster unit is constrained to a region between the minimum axis value and the maximum axis value to implement the rendering of a triangle primitive as half of the corresponding parallelogram.

12. The GPU of claim 9, wherein a setup unit is configured to receive the group of primitives and generate the corresponding parallelogram for each one of the group of primitives, and wherein the setup unit is coupled to communicate with a raster unit via an interface optimized for the transmission of parallelogram parameters.

13. The GPU of claim 11, wherein the parallelogram parameters are configured as a rectangle to represent a line type primitive and as a square to represent a point type primitive.

14. The GPU of claim 11, wherein the parallelogram parameters are configured to collapse into a triangle type primitive when processed by the raster unit as controlled by the location of the inside y-axis mid point or the location of the outside y-axis mid point.

15. The GPU of claim 9, wherein the generating of a corresponding parallelogram for each of the types of primitives is configured to reduce a number primitives used to model a 3-D scene including line primitives, point primitives, and triangle primitives.

16. A computer system, comprising:
a system memory;
a central processor unit coupled to the system memory; and
a graphics processor unit communicatively coupled to the central processor unit;
a set-up unit for receiving a group of primitives from a graphics application, wherein the group includes different types of primitives and the types of primitives include line primitives, point primitives and triangle primitives, wherein for each of the types of primitives, the setup unit generates a corresponding parallelogram, wherein the parallelogram has four sides disposed along an x-axis and a y-axis, and wherein an inside y-axis mid point and an outside y-axis mid point is computed based on the four sides; and
a raster unit coupled to the set-up unit for rasterizing a plurality of pixels in accordance with a plurality of parallelogram parameters received from the setup unit, wherein the setup unit controls the parallelogram to represent each of the primitive types respectively by adjusting a location of the inside y-axis mid point or the outside y-axis mid point.

17. The computer system of claim 16, wherein a setup unit is configured to receive the group of primitives and generate the corresponding parallelogram for each one of the group of primitives, and wherein the setup unit is coupled to communicate with a raster unit via an interface optimized for the transmission of parallelogram parameters.

18. The computer system of claim 16, wherein the raster unit is configured to interpret the parallelogram parameters and rasterize a plurality of resulting pixels based on the parallelogram parameters, wherein the parallelogram parameters are configured as a square to represent a point type primitive and are configured as a rectangle to represent a line type primitive.

19. The computer system of claim 16, wherein the parallelogram parameters are configured to collapse into a triangle type primitive when processed by the raster unit as controlled by the location of the inside y-axis mid point or the location of the outside y-axis mid point.

20. The computer system of claim 16, wherein the generating of a corresponding parallelogram for each of the types of primitives is configured to reduce a number primitives used to model a 3-D scene including line primitives, point primitives, and triangle primitives.

21. The computer system of claim 16, wherein a parallelogram bisector is set to cause the parallelogram to degenerate into a triangle.

* * * * *